United States Patent Office

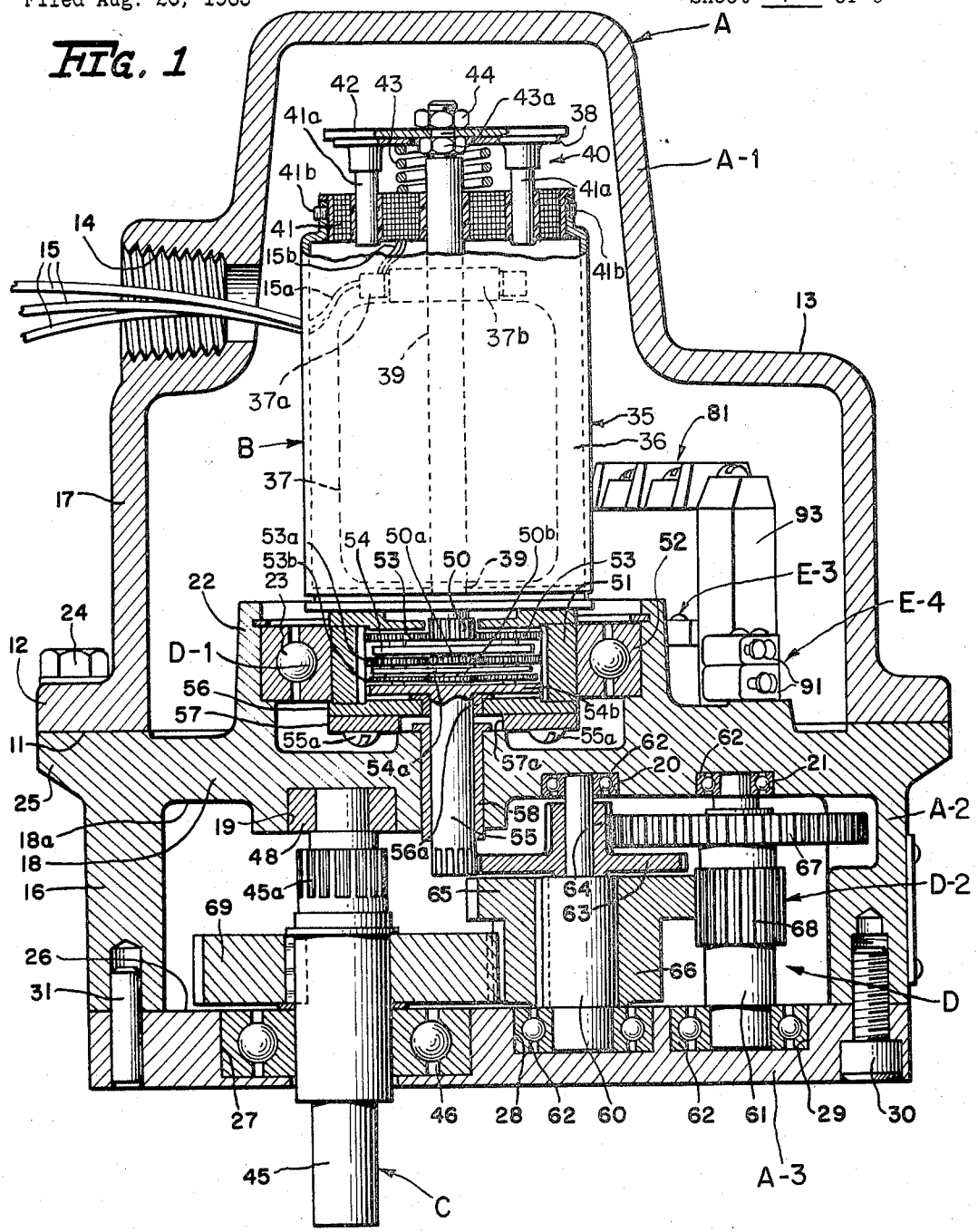

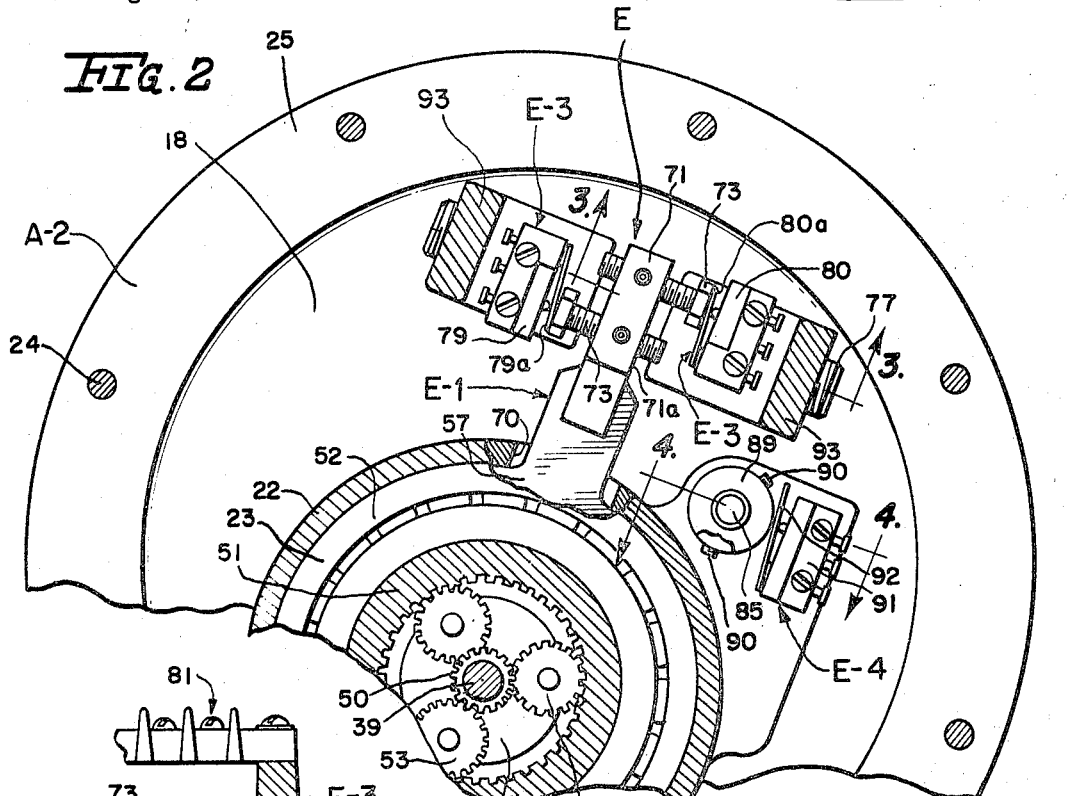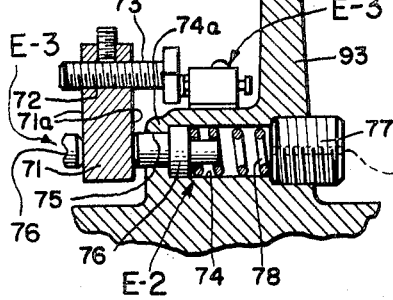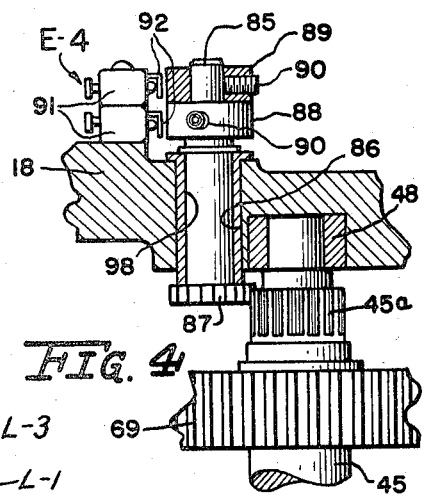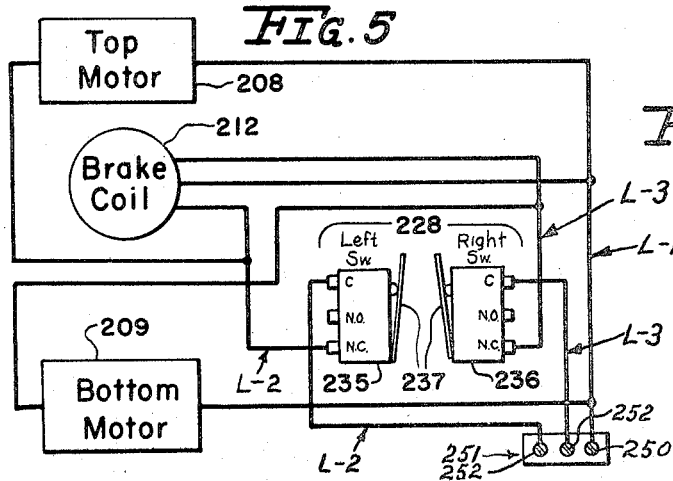

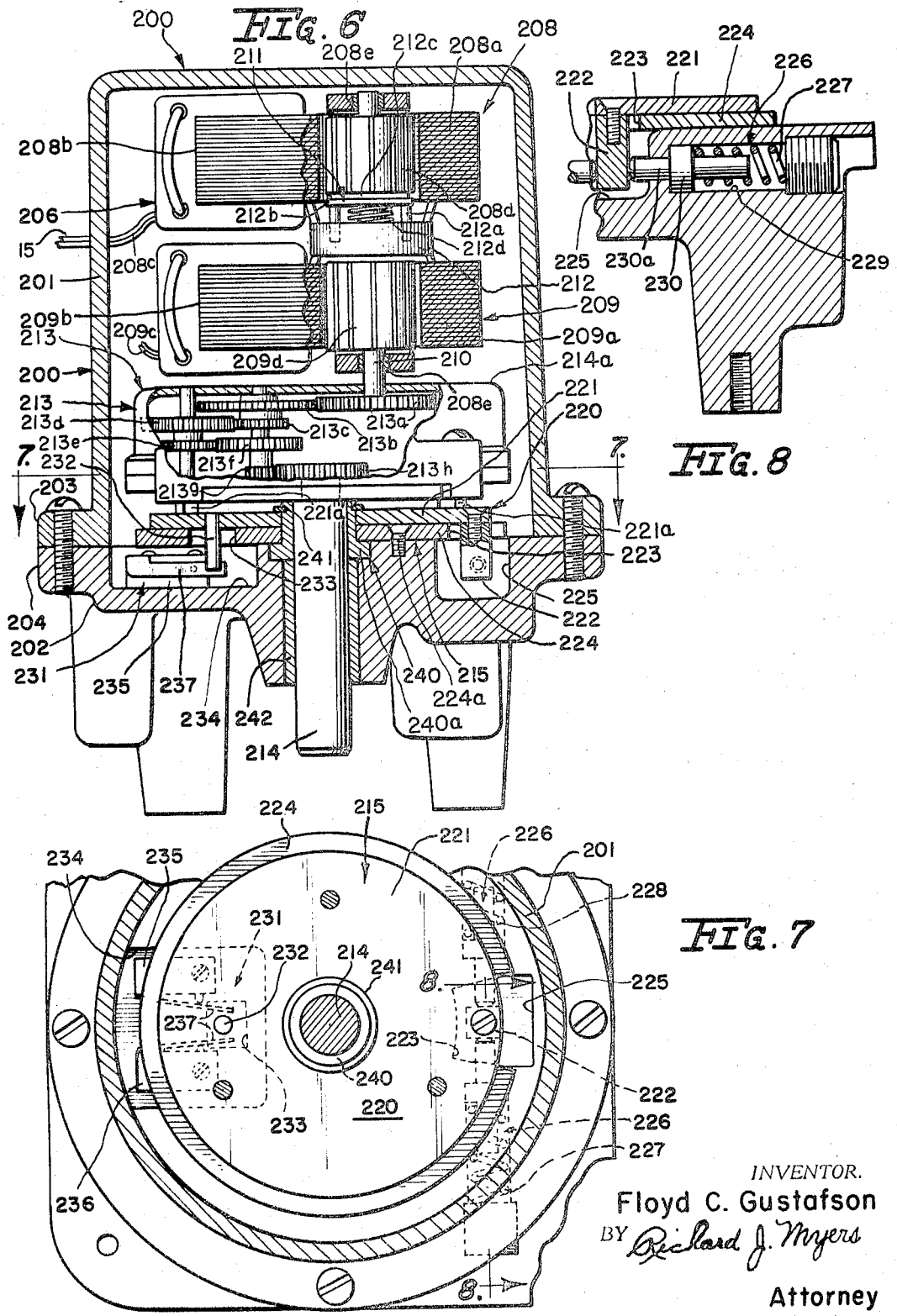

3,423,661
Patented Jan. 21, 1969

---

3,423,661
TORQUE RESPONSIVE OVERLOAD ACTUATOR TO STOP DRIVE AND BRAKE
Floyd C. Gustafson, Lake Zurick, Ill., assignor, by mesne assignments, to The Lunkenheimer Company, Cincinnati, Ohio, a corporation of Delaware
Filed Aug. 26, 1965, Ser. No. 482,809
U.S. Cl. 318—475                    9 Claims
Int. Cl. H02p 3/04

ABSTRACT OF THE DISCLOSURE

An electric motor driven actuator for a valve which includes a torque responsive and inertial energy absorbing overload control operative to sense an overload condition on the valve and immediately de-energize the electric drive motor and apply a brake. The torque overload sensing energy absorption of the device is effected by a transmission which interconnects the electric drive motor and the driven shaft of the device. This transmission includes a torque overload reaction element movable against a spring bias in the event of torque overload to actuate a switch and thereby de-energize the motor and apply the brake.

---

This invention relates to rotary actuating devices and more particularly to improved controls for motorized actuators adapted for automatic operation of such mechanisms as valve structures.

Motorized operation of such related structures as ball-type valves or valves requiring seating of a sealing element, presents problems of overloading of fragile sealing elements as well as possible damage to the actuating device when debris or other material obstruct proper actuation of the sealing element. Therefore, it is a primary object of this invention to provide an improved rotary actuating device which provides means for automatically modifying the operation of a driving means in accordance with the torque demand of a driven member.

It is another object of this invention to provide a rotary actuating device which not only provides means for automatically de-energizing the driving means in accordance with the completion of operative steps of a load device, but also in accordance with unwanted obstruction of operative members at any intermediate condition of the load device.

Yet another object of this invention is to provide a motorized rotary actuating device adapted particularly for valve structures and which provides a torque responsive safety control in addition to multiple rotary sequencing of a driven member while under the influence of the safety control.

Another object of this invention is to provide a motorized rotary actuating device having transmission means mounted in a structure carrying means to stop operation of said device, said structure providing a reaction means upon overloading of the transmission means to operate the means to stop operation of said device.

Still another object of this invention is to provide motorizing means for the rotary actuating device that places the means to stop operation of the device in an inoperative position.

A further object of this invention is to provide an angular indexing means or sweep for the rotary actuating device to control energization of the input of the device in accordance with pre-determined angular movements of the output of the device.

Other objects and advantages of this invention will become more apparent from the detailed description taken in connection with the accompanying drawings, in which:

FIG. 1 is a central sectional elevational view of a rotary actuating device embodying the principles of this invention;

FIG. 2 is a plan view of the device shown in FIGURE 1 with the upper portion of the housing removed;

FIG. 3 is a fragmentary sectional view taken substantially along line 3—3 of FIGURE 2;

FIG. 4 is a fragmentary sectional view of a portion of the device shown in FIGURE 2, taken substantially along the line 4—4 thereof;

FIG. 5 is a schematic illustration of an electrical system for the device of FIGURE 6;

FIG. 6 is a sectional elevational view of an alternative embodiment;

FIG. 7 is a plan view, with portions shown in section, of the device in FIGURE 6; and FIG. 8 is illustrative of an enlarged sectional view of the limit control for the embodiment of FIGURE 6.

Turning now to the drawings and more particularly to FIGURES 1–5, there is illustrated a preferred embodiment of this invention which broadly comprises a housing A having an upper housing section A–1 coupled to a lower housing section A–2 and provided with a base plate A–3. A driving means B is disposed within the upper housing section A–1; a driven means C is journalled in the housing base plate A–3 and has a shaft depending downwardly therefrom forming a part of the operating member for a valve structure such as shown in my copending U.S. patent application, Ser. No. 238,132, now Patent No. 3,204,484, filed Nov. 16, 1962. A transmission D drivingly interconnects the driving means with the driven means and comprises a planetary gear assembly rotatably journalled on the lower housing section A–2; a reduction gear assembly D–2 drivingly interconnects the planetary gear assembly D–1 with the driven means C; assembly D–2 has a plurality of shafts journalled in plate A–3. A limit control E is associated primarily with the planetary gear assembly D–1 and broadly comprises a torque arm E–1 radiating outwardly beyond the planetary assembly D–1. This arm is normally biased to a stationary position by resilient means E–2 and cooperates with a switching means E–3 for regulating the energization of the driving means. The limit control E also comprises an angular indexing mechanism E–4 which is associated preferably with the reduction gear assembly D–2 and is effective to control the energization of the driving means in accordance with pre-determined angular movements of the driven means.

Turning now to the particulars of the basic components, the upper housing section A–1 is hat-like in configuration and has a bottom terminating portion 11 provided with an annular flange 12. This hat-like structure has a cylindrical wall 17 stepped at 13 to accommodate the limit control structure. An electrical entrance opening 14 is provided to accommodate the necessary electrical leads 15. The lower housing section A–2 comprises a cylindrical wall 16 generally aligned with the cylindrical wall 17 of the upper housing section A–1 and carries a flange 25 and a web 18 provided with various recesses 19, 20 and 21 for journalling portions of the reduction gear assembly D–2 on the lower face 18a. This web 18 has an upwardly extending annular flange 22 effective to journal bearing 23 which in turn positions the planetary gear assembly D–1. The sections A–1, A–2 are coupled together by suitable fasteners 24 spaced along the peripheral flanges 12 and 25 respectively. The bottom plate A–3 has an upwardly directed face 26 which is provided with a plurality of recesses 27, 28 and 29, respectively aligned with the recesses 19, 20 and 21, of section A–2. These recesses cooperate in journalling portions of the reduction gear assembly D–2. Dowel pins 31 are received in aligned openings of the bottom plate and lower sections to provide accurate alignment when being assembled. Cap screws 30 couple the portions together.

Driving means B comprises a motor assembly 35 within a housing 36. The motor is preferably electrical shaded pole reversible motor 37 which has an electromagnet in its stator to develop a counter-electrical field in the rotor and is provided with the usual stator brushes 37a connected to leads 15a of leads 15 and a commutator 37b effective to rotate armature rotor or motor shaft 39 in opposite directions in the conventional manner when properly energized through the electrical system. A brake device 40, shown schematically in FIGURE 1, for stopping the motor armature 39 comprises electro-magnetic means which may take the form of an electrically energized solenoid means 41 mounted on housing 36 (by bracket means 41b). An axially movable but non-rotating brake member 38 is movable over shaft 39 and is connected to solenoid plungers 41a. A brake member 42 is mounted on the shaft 39 for rotation therewith and a return spring 43 is mounted between solenoid 41 and member 38. The motor shaft 39 is fixed to brake member 42 by bolt means 44, 43a. When the electric motor 37 is energized the coil or solenoid 41 is energized and its plungers 41a retract against action of compression return spring 43 to separate brake member 38 from brake member 42 allowing rotation of the electrically driven motor shaft 39. When the electric motor is de-energized or the power supply is cut off to solenoid 41 the plunger 41a moves outward under the action of the compression spring 43 with member 38 engaging member 42 to lock shaft 39 against rotation.

The driven means C comprises a shaft 45 journalled in a bearing 46 at an intermediate portion. This bearing 46 is received within a recess 27 of the bottom plate A–3. The upper portion of shaft 45 is journalled in a bushing 48 received in a recess 19 of the web 18.

The planetary gear assembly D–1 comprises a sun gear 50 drivingly keyed to the motor shaft 39. An internal ring gear 51 is mounted concentric with the sun gear 50 and is journalled within a bearing 52 (of the ball type but may be of the roller or needle type bearing). This bearing in turn is nested within the annular flange 22 of the web. Planetary gears 53 are disposed between and in meshing engagement with each of the sun gear 50 and the internal ring gear 51 and are supported by a planetary carrier 54. A second sun gear 50a is carried by planetary carrier 54a and meshes with planetary gears 53a which in turn mesh with ring gear 51. A third sun gear 50b is carried by planetary carrier 54b and meshes with planetary gears 53b which in turn mesh with ring gear 51. The planetary gears 53b are drivingly associated with a shaft 55 which interconnects with the reduction gear assembly D–2. The ring gear 51 is drivingly connected to a pair of plates 56 and 57 which are keyed together by screw means 55a and have central openings 56a and 57a through which is received a sleeve assembly 58 having a central cylindrical wall receiving said shaft 55.

The reduction gear assembly D–2 comprises a pair of parallel but spaced shafts 60 and 61 each having opposite ends journalled within bearings 62 disposed in recesses 20 and 21 of the web and recesses 28 and 29 of the bottom plate. Shaft 60 carries stepped spur gears 63, 64, 65 and 66; gear 63 drivingly meshes with the depending end of shaft 55. Shaft 61 carries stepped spur gears 67 and 68; gear 67 drivingly meshes with the smaller gear 64 and gear 68 meshes with the larger gear 65 of shaft 60. The driven valve operating member or shaft 45 has keyed thereto a spur gear 69 which is in mesh with the smaller gear 66 of shaft 60 resulting in a further drive reduction for shaft 45.

The torque arm E–1 is integrally formed as a part of bottom plate 57 connected with ring gear 51 of the planetary gear assembly. The torque arm radiates outwardly beyond the ring gear 51 through an opening 70 provided in the flange 22 of the web, the latter being enlarged to permit arcuate movement therein. A block 71 is mounted upon the end of the torque arm and has spaced threaded openings 72 provided therein effective to a pair of opposed threadably carry cap screws 73 serving as fingers for inter-engaging the opposed parts of the dual switch means E–3. The opposed dual resilient means E–2 (only one being shown fully in FIGURE 3) comprises spring receptacles 74 defined in housing extensions 93 which are directed toward and at right angles to the torque arm E–1. The receptacles 74 are closed at one end 74a except for a reduced opening 75 through which is received a slidable pilot 76; an adjustable thread stop 77 (provided with dash pot vent hole 77a) is adapted to close the open end of the receptacles. A spring 78 is received in each of the receptacles effective to normally urge the slidable pilot 76 into engagement with the sides 71a of the block 71 constituting part of the torque arm E–1. The upper portions of the respective housing extensions carry micro-switches 79 and 80 having a switching element 79a and 80a respectively which is adapted to be engaged by a respective cap screw or finger 73 mounted upon the torque arm E–1. The switches are placed in electrical series connection with the terminals 81 supported at the top of the housing extensions 93. The springs 78 have a pre-determined calibration effective to normally maintain the torque arm at a centered stationary position in conformity with the expected turning load or torque that is required for the specific valve assembly application.

The angular indexing means E–4 here comprises a shaft 85 rotatably supported within an opening 86 of the web 18 and has at the bottom portion thereof a spur gear 87 effective to engage the knurled or splined portion 45a of the shaft 45. Shaft 85 carries indexing elements 88 and 89 on the upper portion thereof provided with threaded stops 90 which can be adjusted radially with respect to said elements. Micro-switches 91 are mounted adjacent to said shaft 85 and have switch elements 92 effective to be engaged by said stops 90 upon proper turning of the shaft 45 to promote contact. The switches are placed in electrical series relationship as will be shown in FIGURE 5.

FIGURES 6–8 illustrate an alternative embodiment employing a limit control which is effective only to regulate the energization of the motor in accordance with a torque overload of the driven member. The embodiment is characterized by its simplicity of construction and ability to adapt to existing valve structures in the field which are arranged for manual operation. In FIGURE 6, the rotary actuating device has a housing 200 comprised of a cylindrical portion 201 and bottom plate portion 202 coupled together at annular mating flanges 203 and 204 of the respective portions. The upper portion is effective to enclose a tandem or double electrical motor assembly 206 (shown schematically in FIGURE 6) comprised of top motor 208 and bottom motor 209, each effective to turn a motor shaft 210 in opposite rotative direction to the other upon energization. The motor 208 as seen schematically in FIGURE 6 comprises an electro-magnetic core or stator 208a fixedly mounted on housing 214a and receiving current from motor coil 208b and lines 208c connecting with electrical input conduit means 15 and an armature or rotor 208d driving in one direction rotary armature shaft 210 mounted in bearings 208e in housing 201. Motor 209 similarly comprises electro-magnetic core 209a fixedly mounted on housing 214a and receiving current from motor coil 209b, lines 209c and input conduit means 15 and armature 209d driving armature shaft 210 in the opposite direction. A brake means 211 having a coil means 212 is associated with the motors, said coil means or solenoid 212 mounted on housing 201 and electrically connecting with electrical leads 15 and having plungers 212a and brake plate 212b axially reciprocating along shaft 210 and disengaging from brake plate 212c fixedly mounted on shaft 210 and rotor 208d against action of compression return spring 212d upon energizing of coil 212 to allow rotation of shaft 210 and engaging therewith upon de-energizing of coil 212 to stop rotation of shaft 210, said coil 212 being effective to operate in a fashion as described in connection with the preferred embodiment. A multiple spur gear assembly 213 is carried within the housing 214a mounted within the lower extension of the motor assembly 206 wherein a spur gear 213a drivingly connects with operating shaft 214 by reduction gearing of gears 213b, 213c, 213d, 213e, 213f, 213g and 213h which shaft 214 in turn is effective to be fastened to the valve stem or other assembly to be motorized. A plate assembly 215 is disposed between the housing 214a and the bottom portion or actuator base 202 and comprises a pair of plates 221 and 224 that may rotate relative to one another, the inner facing flat surfaces of each being smooth and slideable over one another, the top plate 221 being part of the limit control 220 which is disposed directly beneath the motor and gear assembly instead of being offset as shown in the first embodiment. The top plate 221 is fastened to the motor gear housing 214a of the motor gear assembly 213 by fastening means 221a and the bottom plate 224 is fastened to the bottom portion or actuator base 202 by fastening means 224a. The top plate 221 of the limit control 220 has one or more stops 222 depending from an outer radial portion of plate 221, said stops extending through openings or notches 223 provided in the bottom plate 224, and into wells or recesses 225 defined in the bottom portion of the housing 200. Dash pot means 226 comprises springs 227 and 228 disposed in chordally directed receptacles 229 effective to urge a slidable pilot 230 with nose 230a into contact with each side of the stop 222. The springs are effective to center the stop to a normally stationary position during the driving operation of the valve operator. As an alternative modification, the dash pot assemblies may have a bleed orifice to slow down or decrease the rate of response of the slidable pilots when the stops are moved by the ring gear to overcome the springs.

Instead of placing the micro switches adjacent the dash pot assemblies, as in the preferred embodiment, the switch means 231 is placed at a position of the plate assembly 215 diametrically opposite stop 222 and includes a pin 232 received in the upper plate 221 extending through enlarged openings 233 in the bottom plate and depending into a well or recess 234 of the bottom plate of the housing 200. The micro switches 235 and 236 are mounted on opposite sides of the pin 232 and have switching elements 237 spaced from but adjacent said pin to be operated for de-energizing one or the other of said motors upon rotation of said plate 221 in response to overload conditions causing gear assembly 213 and gear casing 214a to rotatively move relative to base 202.

The two plates 221 and 224 of the plate assembly 215 are carried by a sleeve assembly 240 having a flange 240a and a snap ring 241 to axially maintain said plates axially together, said sleeve assembly being journalled in a portion of the bottom plate 202. The operating shaft 214 extends through the sleeve assembly and is further journalled by a bushing 242 received in a neck of the housing bottom plate 202.

The embodiment of FIGURES 6-8 is characterized by its ability to be mounted upon valve structures without requiring any special equipment for adaptation or re-structuring of the valve. The torque overload means (by way of the limit control, dash pot assembly and micro switch means) not only provides for an automatic control of the motor for operation of the valve, but also provides for an intermediate torque overload through the same means.

Much of the operation of both the preferred and the alternative embodiments is obvious from the explanation of the structure. However, for a further explanation, upon manual or automatic starting of motor 37 of the first embodiment or either one of the motors 208 or 209 of the second embodiment, rotative power will be transmitted to the valve opening shaft 45 or 214 and thereby movement of the valve operator by way of the planetary gear assembly D-1 or spur gear assembly 213. Transmission of said rotative power is conditioned upon the need for holding one of the elements of the planetary gear assembly or the spur gear assembly stationary so as to provide a reaction for the planetary or spur gears or other elements to move thereagainst. In the case of the first embodiment, the ring gear 51 reacts by rotating to operate or rotate to torque arm when output shaft 45 is held stationary and in the case of the second embodiment the gear 213g reacts to operate the torque arm in that said gear 213g rotates about gear 213h of output shaft 214 and the gear assembly 213 and gear housing 214a thereby rotate about gear 213h in direction of rotation of rotor 210 when the shaft 214 is held stationary. Without this reaction, rotative power would not be conveyed. Should the valve operating member be stopped because of an obstruction in the movement of the valve or because a valve has completed its cycle between open and closed positions, the reaction of either the planetary or spur gear assembly will change automatically and stimulate the limit control. The output element of the planetary gear assembly or spur gear assembly will thus become the reaction member causing the normally stationary member to slowly move in an arcuate manner. By having the torque arm or stops coupled to the normally stationary member a limit control can be actuated to shut off the motor upon this occurrence.

In FIGURE 5 is shown a typical manner of electrically associating the micro-switches with the motor assembly for the embodiment of FIGURES 6-8. Lead L-1 connects a terminal 250 on block 251 with each of the top and bottom motors 208 and 209 and brake coil 212. The top motor 208 and one winding of the brake coil have lead L-2 connected back to the terminal 252 of the block with micro-switch 235 interposed in lead L-2. The bottom motor 209 and another winding of the brake coil are connected with terminal 253 on the block by return lead L-3 within which is interposed micro-switch 236. The similar electrical schematic is also applicable to the embodiment of FIGURES 1-4 except as requiring conventional modification to apply to a single motor 37.

Various modifications of the construction illustrated in the drawings and described specifically herein may be made without departing from the spirit and scope of the invention as defined in the appended claims.

What is claimed is:
1. For use in combination with a valve, a rotary actuating device for controlling movement of a valve sealing element relative to a valve seat, said rotary actuating device comprising an electric drive motor means having a rotatable output shaft,
   a driven shaft rotatably mounted on a support,
   transmission means mounted upon said support for drivingly transmitting rotation from the motor means output shaft to the driven shaft, said transmission means including a reaction element movable independently of the rotation of the said motor means output shaft and the driven shaft,
   spring biasing means mounted upon said support for biasing said reaction element to a centered position, and for absorbing kinetic energy of said motor and transmission when said valve sealing element encounters an obstacle to its continued movement,
   limit control switch means for effecting de-energization of said driving motor means in response to a predetermined torque overload condition of the driven shaft, said limit control switch means being responsive to the movement of said reaction means against said spring bias to sense the overload condition of the driven shaft,
   an electrically actuated braking mechanism operatively connected to the output shaft of the said motor, said braking mechanism including an electric coil oper- able to disengage said brake and a spring for biasing said brake into a condition to stop rotation of said motor output shaft, and said limit control switch means being connected to said coil so as to effect de-energization of said braking coil to stop said driven shaft in response to movement of said reaction means upon sensing of the overload condition of the driven shaft.

2. The rotary actuating device of claim 1 wherein said transmission means includes a planetary transmission having a sun gear, at least two planetary gears connected to a planetary carrier, and a ring gear, said reaction element being connected to said ring gear.

3. The rotary actuating device of claim 2 which further includes an angular limit switch means operable to de-energize said motor means and actuate said braking means in response to a predetermined degree of angular rotation of said output shaft.

4. The rotary actuating device of claim 1 wherein said transmission means comprises a spur gear arrangement drivingly interposed between a transmission input shaft and a transmission output shaft, said spur gear arrangement being offset from the center of rotation of said transmission input shaft and said transmission output shaft and supported for movement upon a gearing support structure, said gearing support structure being operative to move said reaction element into engagement with the electric motor means and braking mechanism coil de-energizing limit control switch means upon torque overload of said driven shaft.

5. The actuating device of claim 1 wherein said electric drive motor means comprises two electric motors operable to drive said output shaft in opposite rotative directions.

6. For use in combination with a valve, a rotary actuating device for controlling movement of a valve sealing element relative to a valve seat, said rotary actuating device comprising a rotatable drive motor means having an output shaft,
a rotatable driven shaft,
a transmission including a gearing support structure and a reaction element mounted upon said gearing support structure, said reaction element being mounted for movement independently of the motor means output shaft and the driven shaft,
resilient biasing means for centering said reaction element and for restraining it against movement except upon torque overloading of the driven shaft, said resilient biasing means being operable to absorb inertial energy of said motor and transmission when said valve sealing element encounters an obstacle to its continued movement until said motor and transmission are stopped,
switch means engageable with the reaction element for de-energizing the drive motor upon torque overloading of the driven shaft, said drive motor means comprising an electric motor having a motor brake means including a first brake element fixed relative to the motor shaft and a second brake element movable with the motor shaft, resilient means urging said elements of the brake together to stop the motor output shaft, and an electrically energizable brake coil for separating the brake elements, said coil being de-energized to stop said driven shaft by said switch means upon torque overloading of said driven shaft.

7. The rotary actuating device of claim 6 wherein said transmission comprises a spur gear arrangement drivingly interposed between a transmission input shaft and a transmission output shaft, said spur gear arrangement being offset from the center of rotation of a transmission input shaft and a transmission output shaft and supported by said gearing support structure, and said gearing support structure being operative to move said reaction element into engagement with the electric motor and brake coil de-energizing switch means upon torque overloading of said driven shaft.

8. The rotary actuating device of claim 6 wherein said gearing comprises a planetary gear arrangement drivingly interposed between a transmission input shaft and a transmission output shaft, said planetary gear arrangement comprising a sun gear driven by the planetary gear input shaft and operable to drive at least two planetary gears mounted upon a planetary carrier, said planetary gears being in driving engagement with a ring gear and said planetary carrier being in driving engagement with said transmission output shaft, said ring gear being operatively connected to said reaction element and movable from a centered position upon torque overloading of said driven shaft.

9. The actuating device of claim 8 which further includes angular limit control switch means responsive to a predetermined angular travel of said driven shaft in either of two opposite directions to de-energize said electric motor and said brake coil.

References Cited

UNITED STATES PATENTS

| 2,222,716 | 11/1940 | Mageoch | 318—475 X |
| 2,240,879 | 5/1941 | Arnst | 318—48 X |
| 2,409,132 | 10/1946 | Lear | 318—469 X |
| 2,757,327 | 7/1956 | Oliver | 318—475 X |
| 2,809,309 | 10/1957 | Evans | 318—372 X |
| 3,087,105 | 4/1963 | Hoover | 318—468 |
| 3,199,857 | 8/1965 | Klamp | 318—475 X |

ORIS L. RADER, *Primary Examiner.*

B. A. COOPER, *Assistant Examiner.*

U.S. Cl. X.R.

318—372, 275; 192—2